US006863766B2

(12) United States Patent
Weder

(10) Patent No.: US 6,863,766 B2
(45) Date of Patent: Mar. 8, 2005

(54) METHOD OF FORMING A TRAPEZOIDALLY SHAPED SLEEVE HAVING A PRINTED LOWER PORTION

(75) Inventor: Donald E. Weder, Highland, IL (US)

(73) Assignee: The Family Trust U/T/A dated 12/8/1995, Highland, IL (US)

(*) Notice: Subject to any disclaimer, the term of this patent is extended or adjusted under 35 U.S.C. 154(b) by 0 days.

(21) Appl. No.: 10/775,361

(22) Filed: Feb. 10, 2004

(65) Prior Publication Data

US 2004/0154736 A1 Aug. 12, 2004

Related U.S. Application Data

(63) Continuation of application No. 10/322,140, filed on Dec. 16, 2002, now Pat. No. 6,733,612, which is a continuation of application No. 09/738,655, filed on Dec. 15, 2000, now Pat. No. 6,521,075, which is a continuation of application No. 09/288,345, filed on Apr. 8, 1999, now Pat. No. 6,183,590.

(51) Int. Cl.[7] .......................... B32B 31/00; A01G 9/02

(52) U.S. Cl. ...................... 156/251; 156/267; 156/269; 156/277; 156/270; 47/72; 206/423; 493/194; 493/199; 493/203; 493/235; 493/267

(58) Field of Search ................................ 156/251, 267, 156/269, 277, 270; 47/72; 206/423; 493/194, 199, 203, 235, 267

(56) References Cited

U.S. PATENT DOCUMENTS

| | | | |
|---|---|---|---|
| 4,297,811 A | 11/1981 | Weder | |
| 5,228,234 A | 7/1993 | de Klerk et al. | |
| 5,235,782 A | 8/1993 | Landau | |
| 5,388,695 A | 2/1995 | Gilbert | |
| 5,492,588 A | 2/1996 | Weder et al. | |
| 5,493,809 A | 2/1996 | Weder et al. | |
| 5,496,251 A | 3/1996 | Cheng | |
| 5,496,252 A | 3/1996 | Gilbert | |
| 5,647,168 A | 7/1997 | Gilbert | |
| 5,687,845 A | 11/1997 | Weder | |
| 5,716,137 A | 2/1998 | Meyer | |
| 6,023,885 A | 2/2000 | Weder | |
| 6,183,590 B1 | 2/2001 | Weder | |
| 6,521,075 B2 | 2/2003 | Weder | |
| 6,733,612 B2 * | 5/2004 | Weder | 156/251 |

OTHER PUBLICATIONS

JLEMO Jagenberg–Gruppe Brochure; INERMAT S–ST Single–lane Production Line for Wicketed Bags (6 pages).

* cited by examiner

*Primary Examiner*—Linda Gray
(74) *Attorney, Agent, or Firm*—Dunlap, Codding & Rogers, P.C.

(57) ABSTRACT

A method of forming a plurality of floral sleeves having a uniform design or pattern and printed about a lower end thereof without requiring the waste of significant portions of sheet material is provided. The method includes the step of sealing and severing a pair of web portions along lines defined by coextensive first side edges and coextensive second side edges of printed portions. In another aspect, the method includes the step of sealing and severing a pair of overlapping web portions provided with a plurality of printed portions along a plurality of lines which traverse the printed portions and each of the corresponding unprinted portions to form a plurality of sleeves wherein each sleeve has an upper portion and a lower portion with the lower portion having a printed portion extending about the exterior circumference of the lower portion of the sleeve while the upper portion is free of any printing contained in the lower portion of an adjacently formed sleeve.

7 Claims, 5 Drawing Sheets

METHOD OF FORMING A TRAPEZOIDALLY SHAPED SLEEVE HAVING A PRINTED LOWER PORTION

CROSS-REFERENCE TO RELATED APPLICATIONS

This application is a continuation of U.S. Ser. No. 10/322,140, filed Dec. 16, 2002, now U.S. Pat. No. 6,733,612 which is a continuation of U.S. Ser. No. 09/738,655, filed Dec. 15, 2000, now U.S. Pat. No. 6,521,075, which is a continuation of U.S. Ser. No. 09/288,345, filed Apr. 8, 1999, now U.S. Pat. No. 6,183,590, issued Feb. 6, 2001, the contents of each being hereby expressly incorporated herein by reference.

STATEMENT REGARDING FEDERALLY SPONSORED RESEARCH OR DEVELOPMENT

Not applicable.

BACKGROUND OF THE INVENTION

1. Field of the Invention

The present invention relates generally to manufacturing floral sleeves, and more particularly, but not by way of limitation, to a method of manufacturing a plurality of floral sleeves with an ornamental design printed on only a portion of each floral sleeve.

2. Brief Description of the Related Art

Sleeves used for wrapping floral groupings and potted plants are well known in the art. Such sleeves are generally fabricated of a flexible sheet material and have an open upper end and an open or closed bottom end. The flexibility of the material permits the sleeves to be expanded into a frusto-conically shaped tube and to be flattened into a trapezoidally shaped configuration. Sleeves can be formed from a pair of webs, a single folded web, or a tubular web. Regardless of the form of the material used, overlapping portions are transversely sealed together to form a pair of sealed edges extending from the upper end of the sleeve to the bottom of the sleeve. To reduce waste, sleeves are formed so as to be inverted relative to the adjacent sleeves and so that adjacent sleeves share a common edge. The web is then cut along the sealed edges to form the sleeves.

In the manufacturing of sleeves, it is often desirable that the sleeve be provided with decorative designs or patterns on a lower portion of the sleeve while leaving the upper portion of the sleeve relatively unobstructed for viewing of the floral grouping through the sleeve. Problems have been encountered in the manufacture of sleeves with printed lower portions, however, in that the printed design is not printed uniformly about the entire lower portion of the sleeve. That is, an unprinted section or strip remains adjacent the sealed edge. Alternatively, the printed design on the lower portion overlaps onto the upper portion of the adjacent sleeve.

In an effort to overcome the above mentioned problems, U.S. Pat. No. 5,496,252, issued to Scott Robert Gilbert, discloses a method of forming a plurality of floral sleeves that do not have unprinted edges and which do not have printing overlap in the upper portion thereof. However, this method requires that a significant amount of material be wasted in that an amount of material for forming more than one half a sleeve every other sleeve formed is discarded.

To this end, a need exists for a method of forming a plurality of floral sleeves having a uniform design or pattern imprinted circumferentially thereabout without requiring the waste of significant portions of sheet material. It is to such a method that the present invention is directed.

BRIEF SUMMARY OF THE INVENTION

The present invention is directed to a method of forming a plurality of sleeves wherein each of the sleeves has an upper portion and a lower portion, with the lower portion having a printed portion extending continuously about the circumference of the lower portion of the sleeve, the method comprising providing a first web portion having a plurality of successive printed portions extending along a longitudinal axis of the first web portion in a staggered, inverted relationship and a plurality of corresponding unprinted portions. Each printed portion of the first web portion has a top edge, a bottom edge, a first side edge, and a second side edge. The first and second side edges of each printed portion of the first web portion is angled outwardly from the bottom edge to the top edge and the first side edge of each printed portion is coextensive with the first side edge of one of the adjacent printed portions. The second side edge of each printed portion is coextensive with the second side edge of the oppositely adjacent printed portion.

A second web portion is provided. The second web portion has a plurality of successive printed portions extending along a longitudinal axis of the second web portion in a staggered, inverted relationship and a plurality of corresponding unprinted portions. Each printed portion of the second web portion has a top edge, a bottom edge, a first side edge, and a second side edge. The first and second side edges of each printed portion is angled outwardly from the bottom edge to the top edge. The first side edge of each printed portion is coextensive with the first side edge of one of the adjacent printed portions and the second side edge of each printed portion is coextensive with the second side edge of the oppositely adjacent printed portion.

The first web portion is positioned on the second web portion such that the printed portions of the first web portion are superimposed over the printed portions of the second web portion and such that the unprinted portions of the first web portion are superimposed over the unprinted portions of the second web portion.

Finally, the first and second web portions are sealed and severed along lines defined by the coextensive first sides edges and the coextensive second side edges of each of the printed portions thereby forming a plurality of sleeves wherein each sleeve has an upper portion and a lower portion with the lower portion having a printed portion extending continuously about the exterior circumference of the lower portion of the sleeve while the upper portion is free of any printing contained in the lower portion of an adjacently formed sleeve.

In another aspect, the present invention is directed to a method of forming a plurality of sleeves by providing a pair of web portions. The first web portion has a plurality of successive printed portions extending along a longitudinal axis of the first web portion in a staggered, inverted relationship and a plurality of corresponding unprinted portions Each printed portion of the first web portion has a top edge, a bottom edge, a first side edge, and a second side edge The first and second side edges of each printed portion is angled outwardly from the bottom edge to the top edge and the first side edge of each printed portion is substantially aligned with the first side edge of one of the adjacent printed portions and the second side edge of each printed portion being substantially aligned with the second side edge of the oppositely adjacent printed portion.

A second web portion is provided having a plurality of successive printed portions extending along a longitudinal axis of the second web portion in a staggered, inverted relationship and a plurality of corresponding unprinted portions is provided. Each printed portion of the second web portion has a top edge, a bottom edge, a first side edge, and a second side edge. The first and second side edges of each printed portion are angled outwardly from the bottom edge to the top edge. The first side edge of each printed portion is substantially aligned with the first side edge of one of the adjacent printed portions and the second side edge of each printed portion is substantially aligned with the second side edge of the oppositely adjacent printed portion.

The first web portion is positioned on the second web portion such that each of the printed portions of the first web portion are substantially superimposed over a corresponding printed portion of the second web portion to form a plurality of superimposed pairs of printed portions and such that each of the unprinted portions of the first web portion are substantially superimposed over a corresponding unprinted portion of the second web portion to form a plurality of superimposed pairs of unprinted portions.

The first and second web portions are sealed and severed along a plurality of first lines and a plurality of second lines to form a plurality of sleeves wherein each sleeve has an upper portion and a lower portion, with the lower portion having a printed portion extending continuously about the exterior circumference of the lower portion of the sleeve while the upper portion is free of any printing contained in the lower portion of an adjacently formed sleeve. Each first line traverses each of the printed portions of one of the superimposed pairs of printed portions substantially proximate to the first side edges of the printed portions of the superimposed pair of printed portions and traverses each unprinted portion of a corresponding superimposed pair of unprinted portions substantially parallel and proximate to the first side edges of the printed portions of one of the adjacent superimposed pairs of printed portions. Each second line traverses each of the printed portions of one of the superimposed pairs of printed portions substantially parallel and proximate to the second side edges of the printed portions of the superimposed pair of printed portions and traverses each unprinted portion of the corresponding superimposed pair of unprinted portions substantially parallel and proximate to the second side edges of the printed portions of one of the oppositely adjacent superimposed pair of printed portions.

The objects, features and advantages of the present invention will become apparent from the following detailed description when read in conjunction with the accompanying drawings and appended claims.

DETAILED DESCRIPTION OF THE INVENTION

Figure 1:
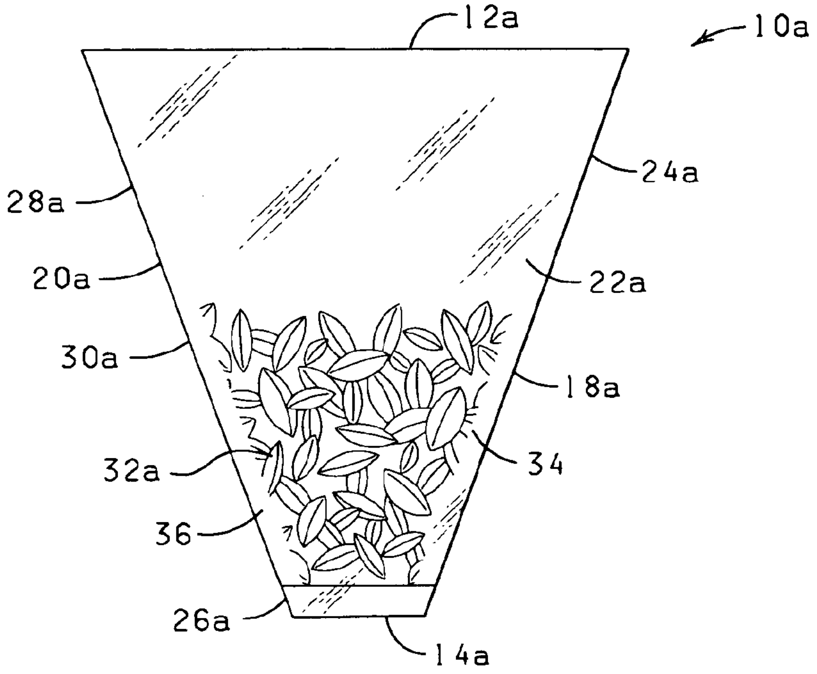
FIG. 1 Prior Art
FIG. 1 is a side elevational view of a prior art sleeve having a printed lower portion with a “racing stripe” on each side thereof and an unprinted upper portion.
Figure 2:
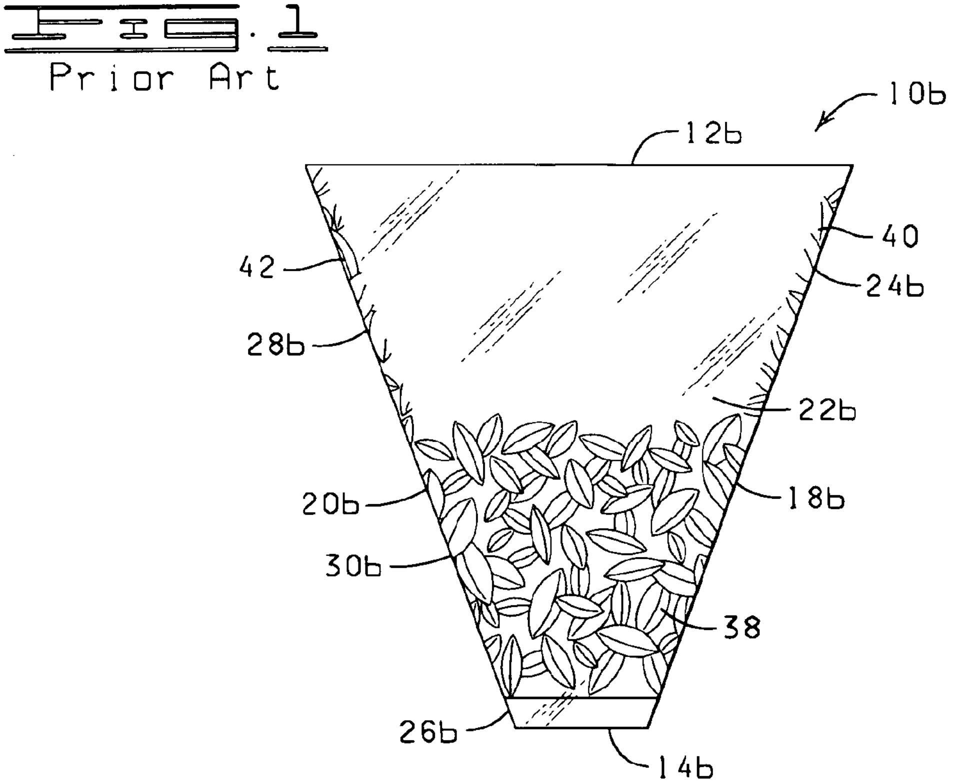
FIG. 2 Prior Art
FIG. 2 is a side elevational view of a prior art sleeve having a printed lower portion and an upper portion with an overlapping printed portion.
Figure 3:
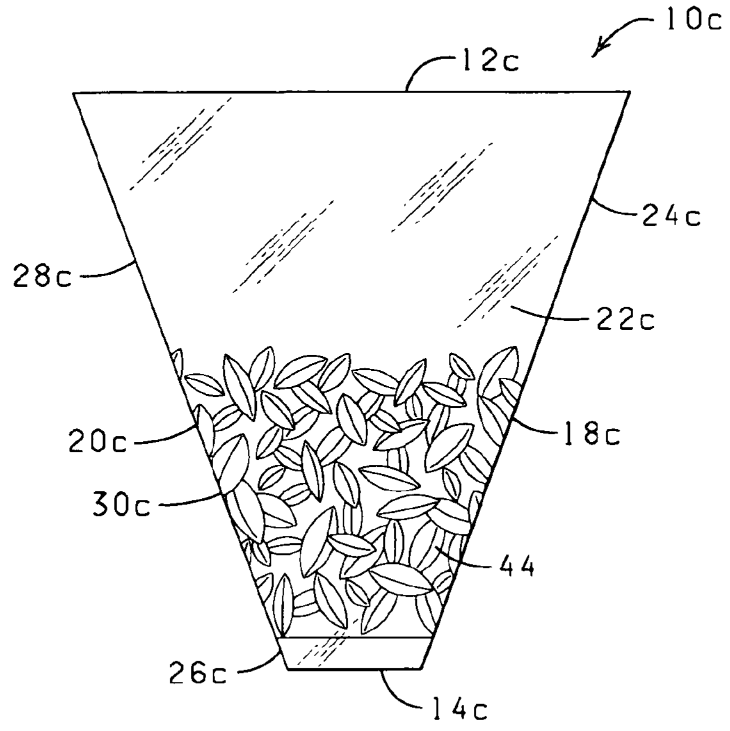
FIG. 3 Prior Art
FIG. 3 is a side elevational view of a prior art sleeve having a continuously printed lower portion and an unprinted upper portion.

Referring now to the drawings, and more particularly to FIGS. 1–3, shown therein and designated by the general reference numerals 10*a*, 10*b*, and 10*c*, respectively, are three examples of flexible bags or sleeves of unitary construction. Each of the sleeves 10*a*, 10*b*, and 10*c* comprises a flexible flattened piece of material which is openable into the form of a tube or sleeve. Further, each of the sleeves 10*a*, 10*b*, and 10*c* is tapered outwardly from the lower end toward a larger diameter at its upper end. In its flattened state, each of the sleeves 10*a*, 10*b*, and 10*c* has an overall trapezoidal shape, and when opened, is generally substantially frusto-conical.

The sleeves 10*a*, 10*b*, 10*c* are constructed from any suitable material that is capable of being formed into a sleeve and wrapped about a pot and a floral grouping disposed therein. Preferably, the material comprises paper (untreated or treated in any manner), cellophane, metal foil, polymer film, non-polymer film, fabric (woven or nonwoven or synthetic or natural), cardboard, fiber, cloth, burlap, or laminations or combinations thereof.

The term “polymer film” means a man-made polymer such as a polypropylene or a naturally occurring polymer such as cellophane. A polymer film is relatively strong and not as subject to tearing (substantially non-tearable), as might be the case with paper or foil.

The material from which the sleeves 10*a*, 10*b*, and 10*c* are constructed preferably has a thickness in a range from about 0.1 mils to about 30 mils, although in some cases the sleeves may be much thicker, especially when the sleeves are constructed from multiple layers. Often, the thicknesses of the sleeves 10*a*, 10*b*, and 10*c* are in a range from about 0.5 mils to about 10 mils. Preferably, the sleeves 10*a*, 10*b*, and 10*c* have thickness in a range from about 1.0 mil to about 5 mils. More preferably, the sleeves 10*a*, 10*b*, and 10*c* are constructed from material which is flexible, semi-rigid, rigid, or any combination thereof. The sleeves 10*a*, 10*b*, and 10*c* may be constructed of a single layer of material or a plurality of layers of the same or different types of materials. Any thickness of the material may be utilized as long as the material functions in accordance with the present invention as described herein. The layers of material comprising the sleeves 10*a*, 10*b*, and 10*c* may be connected together or laminated or may be separate layers. Such materials used to construct sleeves are described in U.S. Pat. No. 5,111,637 entitled “Method For Wrapping A Floral Grouping” issued to Weder et al., on May 12, 1992, which is hereby incorporated herein by reference. Any thickness of material may be utilized in accordance with the present invention as long as the sleeves 10*a*, 10*b*, and 10*c* may be formed as described herein, and as long as the formed sleeves 10*a*, 10*b*, and 10*c* may contain at least a portion of a pot or potted plant or a floral grouping, as described herein. Additionally, an insulating material such as bubble film, preferable as one of two or more layers, can be utilized in order to provide additional protection for the item, such as the floral grouping, contained therein.

In one embodiment, the sleeves 10*a*, 10*b*, and 10*c* may be constructed from two polypropylene films. The material comprising the sleeves 10*a*, 10*b*, and 10*c* may be connected together or laminated or may be separate layers. In an alternative embodiment, the sleeves 10*a*, 10*b*, and 10*c* may be constructed from only one of the polypropylene films.

The sleeves 10*a*, 10*b*, and 10*c* may also be constructed, in whole or in part, from a cling material. "Cling Wrap or Material", when used herein, means any material which is capable of connecting to the sheet of material and/or itself upon contacting engagement during the wrapping process and is wrappable about an item whereby portions of the cling material contactingly engage and connect to other portions of another material, or, alternatively, itself, for generally securing the material wrapped about at least a portion of a pot. This connecting engagement is preferably temporary in that the material may be easily removed, i.e., the cling material "clings" to the pot.

The cling material is constructed and treated if necessary, from polyethylene such as Cling Wrap made by GLAD®, First Brands Corporation, Danbury, Conn. The thickness of the cling material will, in part, depend upon the size of sleeve 10*a*, 10*b* or 10*c*, and the size of the pot in the sleeve 10*a*, 10*b* or 10*c*, i.e., generally, a larger pot may require a thicker and therefore stronger cling material. The cling material will range in thickness from less than about 0.1 mils to about 10 mils, and preferably less than about 0.5 mils to about 2.5 mils and most preferably from less than about 0.6 mils to about 2 mils. However, any thickness of cling material may be utilized in accordance with the present invention which permits the cling material to function as described herein.

It will generally be desired to use the sleeve 10*a*, 10*b* or 10*c* as a covering for a potted plant such as is well known in the art. The term "pot" as used herein refers to any type of container used for holding a floral grouping or plant. Examples of pots, used in accordance with the present invention include, but not by way of limitation, clay pots, wooden pots, plastic pots, pots made from natural mud/or synthetic fibers, or any combination thereof. The pot is adapted to receive a floral grouping in the retaining space. The floral grouping may be disposed within the pot along with a suitable growing medium described in further detail below, or other retaining medium, such as a floral foam. It will also be understood that the floral grouping, and any appropriate growing medium or other retaining medium, may be disposed in the sleeve 10 without a pot.

The term "floral grouping" as used herein means cut fresh flowers, artificial flowers, a single flower or other fresh and/or artificial plants or other floral materials and may include other secondary plants and/or ornamentation or artificial or natural materials which add to the aesthetics of the overall floral grouping. The floral grouping comprises a bloom or foliage portion and a stem portion. Further, the floral grouping may comprise a growing potted plant having a root portion (not shown) as well. However, it will be appreciated that the floral grouping may consist of only a single bloom or only foliage, or a botanical item (not shown), or a propagule (not shown) the term "floral grouping" may be used interchangeably herein with both the terms "floral arrangement" and "potted plant". The term "floral grouping" may also be used interchangeably herein with the terms "botanical item" and/or "propagule."

The term "growing medium" when used herein means any liquid, solid or gaseous material used for plant growth or for the cultivation of propagules, including organic and inorganic materials such as soil, humus, perlite, vermiculite, sand, water, and including the nutrients, fertilizers or hormones or combinations thereof required by the plants or propagules for growth.

The term "botanical item" when used herein means a natural or artificial herbaceous or woody plant, taken singly or in combination. The term "botanical item" also means any portion or portions of natural or artificial herbaceous or woody plants including stems, leaves, flowers, blossoms, buds, blooms, cones, or roots, taken singly or in combination, or in groupings of such portions such as bouquet or floral grouping.

The term "propagule" when used herein means any structure capable of being propagated or acting as an agent of reproduction including seeds, shoots, stems, runners, tubers, plants, leaves, roots or spores.

Referring now more specifically to FIG. 1, the sleeve 10*a* has an open upper end 12*a*, a lower end 14*a*, a sealed first edge 18*a*, a sealed second edge 20*a*, a first side 22*a* and a second side 24*a*. Preferably the lower end 14*a* is closed and provided with a gusset 26*a*, but it may be sealed along an edge. When the lower end 14*a* of the sleeve 10*a* has a closed bottom, the gusset 26*a* may take the form of any known gusset, such as an inwardly folded portion or an outwardly folded portion, as illustrated in FIG. 1. It should be appreciated that the gusset 26*a* permits a circular bottom of an object such as a potted plant to be disposed into the inner retaining space of the lower end 14*a* of the sleeve 10*a*.

The sleeve 10*a* is characterized as having an upper portion 28*a* and a lower portion 30*a*. The lower portion 30*a* is generally defined as being that portion of the sleeve 10*a* sized to extend about the exterior surface of a pot (not shown) when the pot is disposed in the sleeve 10*a* in a manner well known in the art. The upper portion 28*a* of the sleeve 10*a* is sized to substantially surround and encompass a floral grouping (not shown) extending from the pot.

The upper portion 28*a* and the lower portion 30*a* may be demarcated by a detaching element (not shown) for enabling the upper portion 28*a* to be selectively removed from the lower portion 30*a*. The term "detaching element" as used herein, generally means any element or combination of elements or features, such as but not limited to, perforations, tear strips, tear starts, zippers, and any other devices or elements of this nature known in the art, or any combination thereof, which enable or facilitate the tearing away or detachment of one object from another. Therefore, while perforations are shown and described herein, it will be understood that tear strips, zippers, or any other "detaching elements" known in the art, or any combinations thereof, could be substituted therefor.

It should be noted that the sleeves 10*b* and 10*c* shown in FIGS. 2 and 3 are substantially identical in construction to the sleeve 10*a* described above. Therefore, for the sake of brevity, the sleeves 10*b* and 10*c* will not be described in detail, but like numerals are used to represent like components with the exception that components of the sleeves 10*b* and 10*c* are denoted with the letters "b" and "c", respectively.

As mentioned above, it is often desirable that the upper portion of the sleeve be substantially transparent or otherwise pervious to light to permit relatively unobstructed viewing of the floral grouping through the sleeve and that the lower portion be provided with a decorative designs or pattern.

With respect to the sleeve 10*a*, the lower portion 30*a* of the sleeve 10*a* is shown to have a printed area 32 which extends over the lower portion 30*a* of the sleeve 10*a* with the exception of an unprinted section or strip 34 adjacent the sealed edge 18*a* and an unprinted section or strip 36 adjacent the sealed edge 20*a*.

With respect to the sleeve 10*b*, the lower portion 30*b* of the sleeve 10*b* is shown to have a printed area 38 which extends over the entire lower portion 30*b* of the sleeve 10*b* and further has a printed section 40 on the upper portion 28*b* adjacent the sealed edge 18*b* and a printed section or strip 42 adjacent the sealed edge 20*b*.

Finally, with respect to the sleeve 10*c*, the lower portion 30*c* of the sleeve 10*c* is shown to have a printed area 44 which extends over the entire lower portion 30*c* of the sleeve 10*c* with no overlapping printed portion being present on the upper portion 28*c*.

Figure 4:
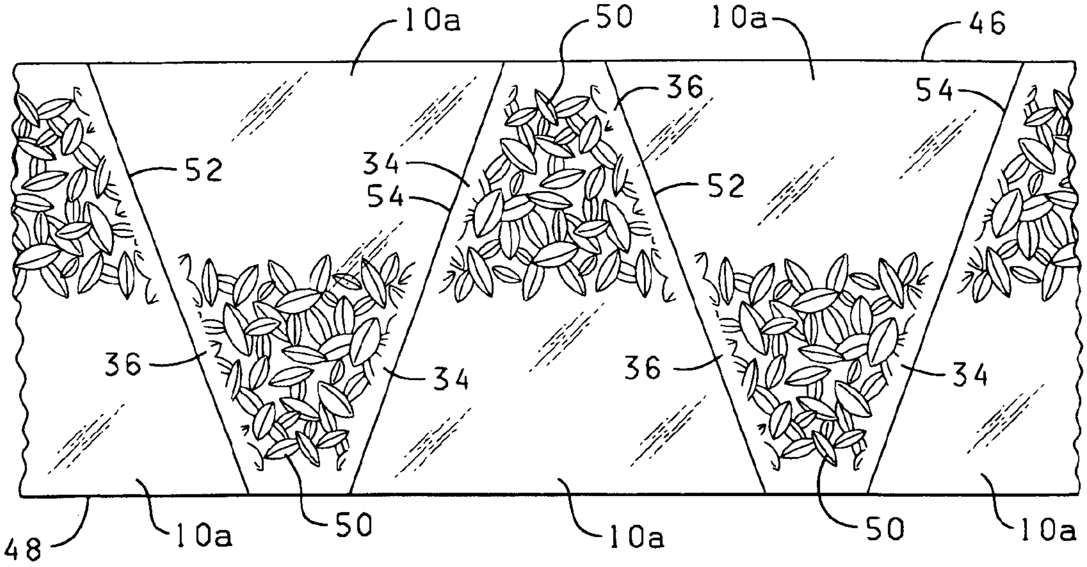
FIG. 4 Prior Art
FIG. 4 is a plan view of a portion of a web of material illustrating a prior art printing and sealing pattern for forming the sleeve of FIG. 1
Figure 5:
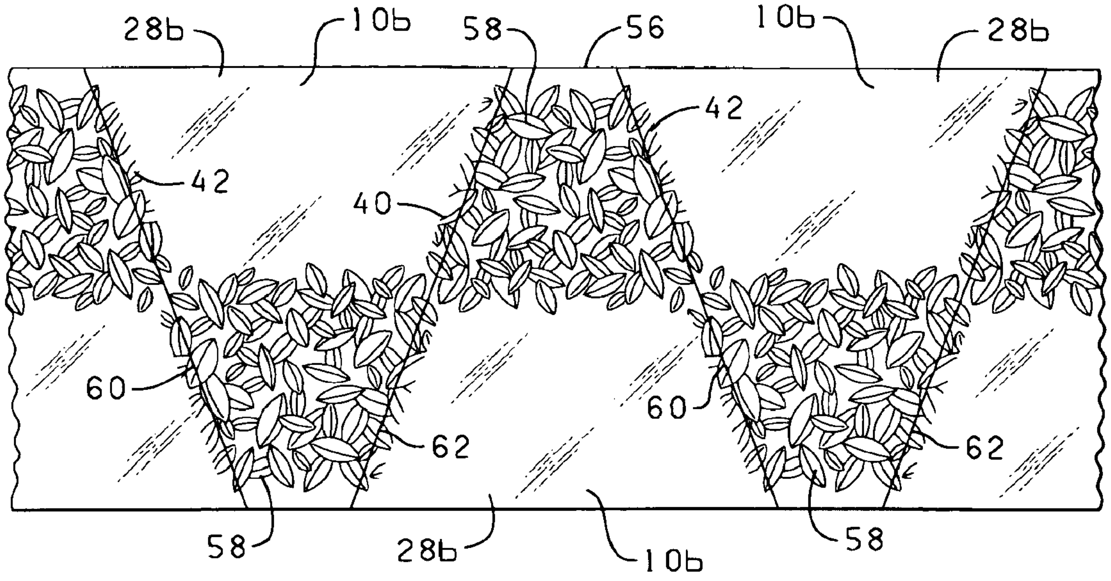
FIG. 5 Prior Art
FIG. 5 is a plan view of a portion of a web of material illustrating a prior art printing and sealing pattern for forming the sleeve of FIG. 2.
Figure 6:
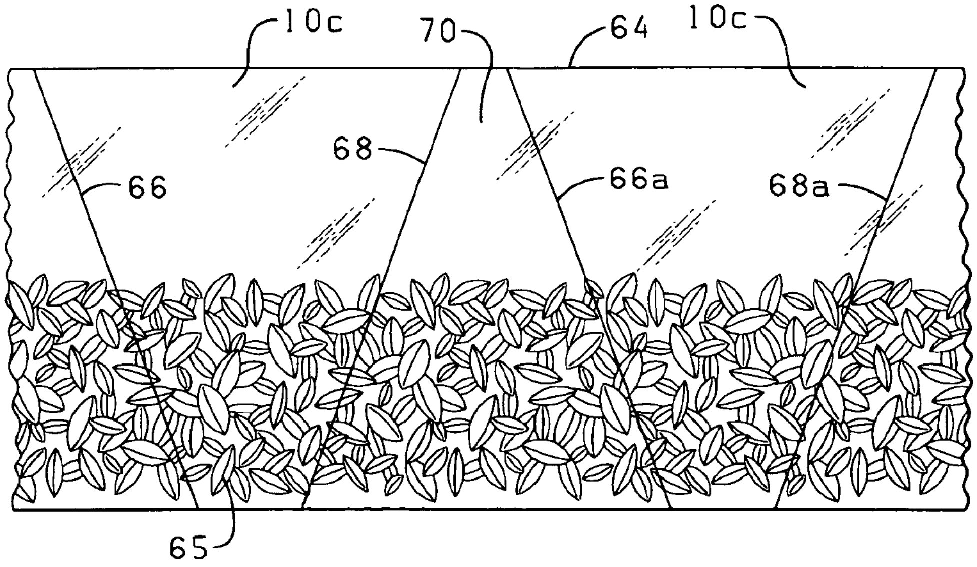
FIG. 6 Prior Art
FIG. 6 is a plan view of a portion of a web of material illustrating a prior art printing and sealing pattern for forming the sleeve of FIG. 3.

Of the three sleeves 10*a*, 10*b*, and 10*c*, the sleeve 10*c* is generally regarded as providing the preferred aesthetic appearance, as the sleeve 10*c* is free from a "racing stripe" which breaks up the continuity of the printed image around the circumferential area of the lower portion of the sleeve, and is also free of the "overlap" which is an indication of poor quality and partially impedes the view of the contents within the upper portion of the sleeve. FIGS. 4–6 illustrate prior art methods of forming the plurality of the sleeves 10*a*, 10*b*, and 10*c*, respectively, from a single folded web of material. It will be appreciated, however, that the sleeves 10*a*, 10*b*, and 10*c* are also commonly formed from pairs of overlapping webs or a tubular web.

Referring now to FIG. 4, shown is a portion of a single web of material 46 folded in half along line 48 and used for forming the sleeve 10*a* illustrated in FIG. 1. The web of material 46 is printed along a longitudinal axis with successive printed portions 50 which are spaced apart from each other so that web of material 46 may be sealed and cut along lines 52 and 54 in an unprinted portion. By sealing and cutting the web of material 46 along the unprinted portion, the unprinted strips 34 and 36 are formed adjacent each side edge in the lower portion 30*a* of each sleeve 10*a*. However, no material is wasted and no "overlap" is formed on the upper portion 28*a* of the sleeve 10*a*.

As shown in FIG. 5, the sleeves 10*b* are formed by providing a single web of material 56 having printed portions 58 which are diagonally opposed in mirror images except that each printed portion 58 extends longitudinally past the line along which an edge is to be formed. As a result, the printed portion 58 overlaps on to the upper portion 28*b* of the adjacent sleeve upon sealing and cutting the web of material 56 along lines 60 and 62, thereby forming the printed sections 40 and 42 on the upper portion 28*b* of the sleeve 10*b*. Like the method illustrated in FIG. 4, no portion of the web of material 56 is wasted in the forming of the sleeves 10*b*.

In forming of the sleeve 10*c*, illustrated in FIG. 6, a single web of material 64 is provided with a printed portion 65 along a lower portion of the web of material 64 while an upper portion of the web of material remains unprinted. The web of material 64 is sealed and cut along lines 66 and 68 to form a sleeve 10*c* and along lines 66*a* and 68*a* to form another sleeve 10*c*. An area 70 of the web of material 64 bounded by the lines 68 and 66*a* is discarded. As such, the sleeves 10*c* do not have unprinted edges or printing overlap in the upper portion thereof. However, this method requires that a significant amount of material be wasted in the process and an amount of material for forming more than one-half a sleeve every other sleeve formed is discarded. Because of the need for a method of forming a plurality of floral sleeves having a uniform design or pattern printed circumferentially thereabout without requiring the waste of significant portions of material, a need for an improved method of forming floral sleeves has been recognized.

FIGS. 7–10 illustrate improved methods of forming floral sleeves having continuous patterns imprinted circumferentially thereabout on a lower portion thereof. These methods overcome the before-mentioned deficiencies of the prior art methods, and thus represent advancements in the state of the art relating to floral sleeves.

Figure 7:
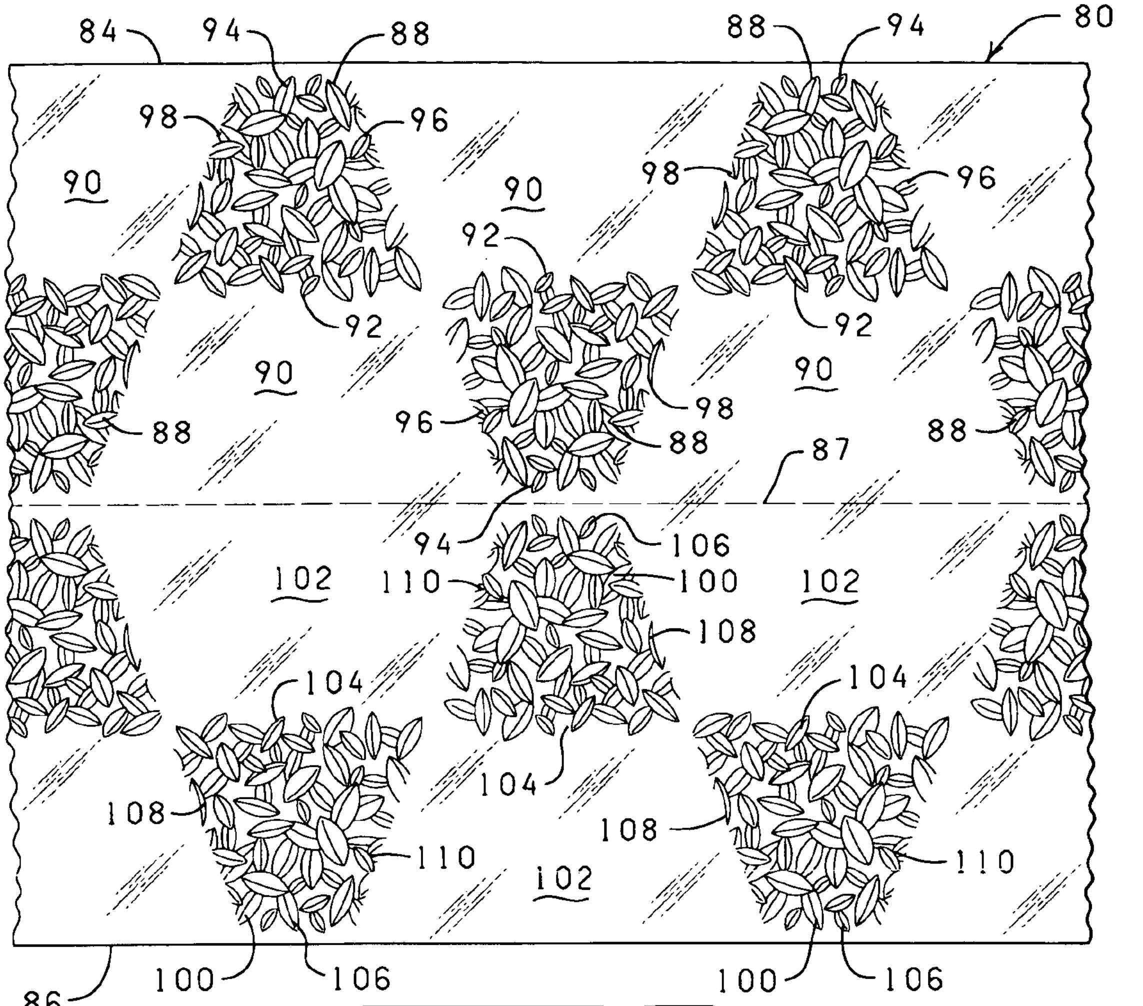
FIG. 7 is a plan view of a portion of a web of material illustrating a printing pattern constructed in accordance with the present invention for forming the sleeve of FIG. 3 with no excess material.

FIG. 7 shows a portion of a web of material 80 divided into a first web portion 84 and a second web portion 86 by dashed line 87.

The first web portion 84 is printed with a plurality of successive printed portions 88 extending along the longitudinal axis of the first web portion 84 in a staggered, inverted relationship. The first web portion 84 further has a plurality of corresponding unprinted portions 90. Each printed portion 88 of the first web portion 84 has a top edge 92, a bottom edge 94, a first side edge 96, and a second side edge 98. The first and second side edges 96 and 98 of each printed portion 88 of the first web portion 84 is angled outwardly from the bottom edge 94 to the top edge 92 such that each printed portion 88 has a generally trapezoidal shape. Further, each printed portion 88 is printed on the web of material 80 so that the first side edge 96 of each printed portion 88 is coextensive with the first side edge 96 of the adjacent printed portion 88, and the second side edge 98 of each printed portion 88 is coextensive with the second side edge 98 of the opposite adjacent printed portion 88.

Similarly, the second web portion 86 is printed with a plurality of successive printed portions 100 extending along the longitudinal axis of the second web portion 86 in a staggered, inverted relationship. The second web portion 86 further has a plurality of corresponding unprinted portions 102. Each printed portion 100 of the second web portion 86 has a top edge 104, a bottom edge 106, a first side edge 108, and a second side edge 110. The first and second side edges 108 and 110 of each printed portion 100 of the second web portion 86 is angled outwardly from the bottom edge 106 to the top edge 104 such that each printed portion 100 has a generally trapezoidal shape. Further, the printed portions 100 are printed on the web of material 80 so that the first side edge 108 of each printed portion 100 is coextensive with the first side edge 108 of the adjacent printed portion 100, and a second side edge 110 of each printed portion 100 is coextensive with the second side edge 112 of the oppositely adjacent printed portion 100.

Figure 8:
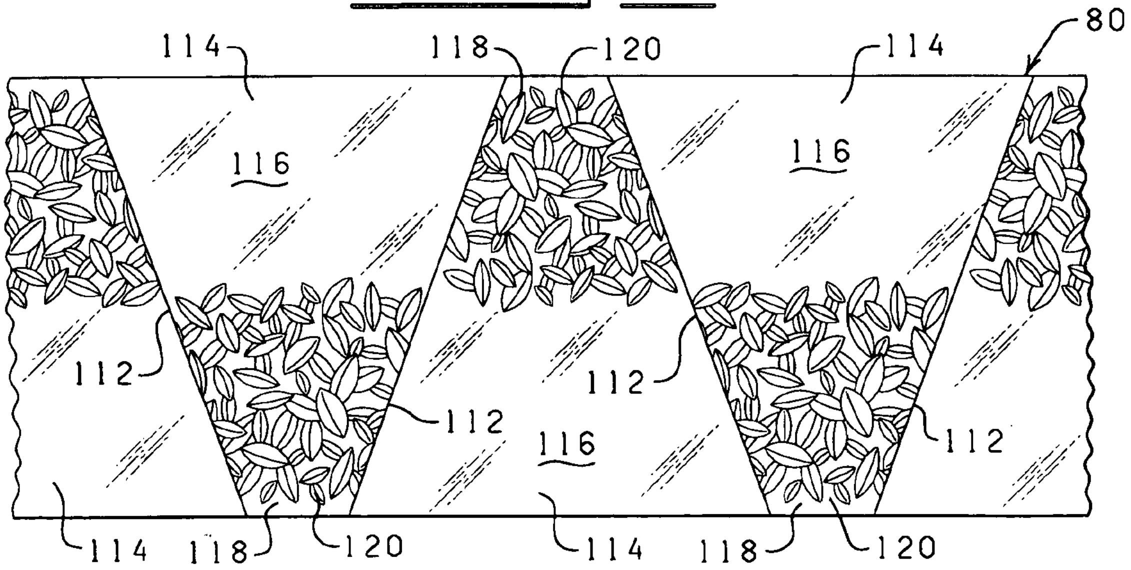
FIG. 8 is a plan view of the web of material of FIG. 7 illustrating the web of material folded in half and a cutting and sealing pattern for forming the sleeve of FIG. 3 with no excess material.

As illustrated in FIG. 8, the web of material 80 is folded along the line 87 to position the first web portion 84 on the second web portion 86 such that the printed portions 88 of the first web portion 84 are superimposed over the printed portions 100 of the second web portion 86 and the unprinted portions 90 of the first web portion are superimposed over the unprinted portions 102 of the second web portion 86.

A series of sleeves is in turn formed by sealing and severing the first and second web portions 84 and 86 along lines 112 defined by the coextensive first side edges 96 and 108, and the coextensive second side edges 98 and 110 of each of the printed portions 88 and 100, thereby forming a plurality of sleeves, similar to the sleeve 10*c* illustrated in FIG. 3. Each sleeve has an upper portion and a lower portion with the lower portion having a printed portion extending continuously about the exterior circumference of the lower portion of the sleeve while the upper portion is free of any printing contained in the lower portion of an adjacently formed sleeve.

Figure 9:
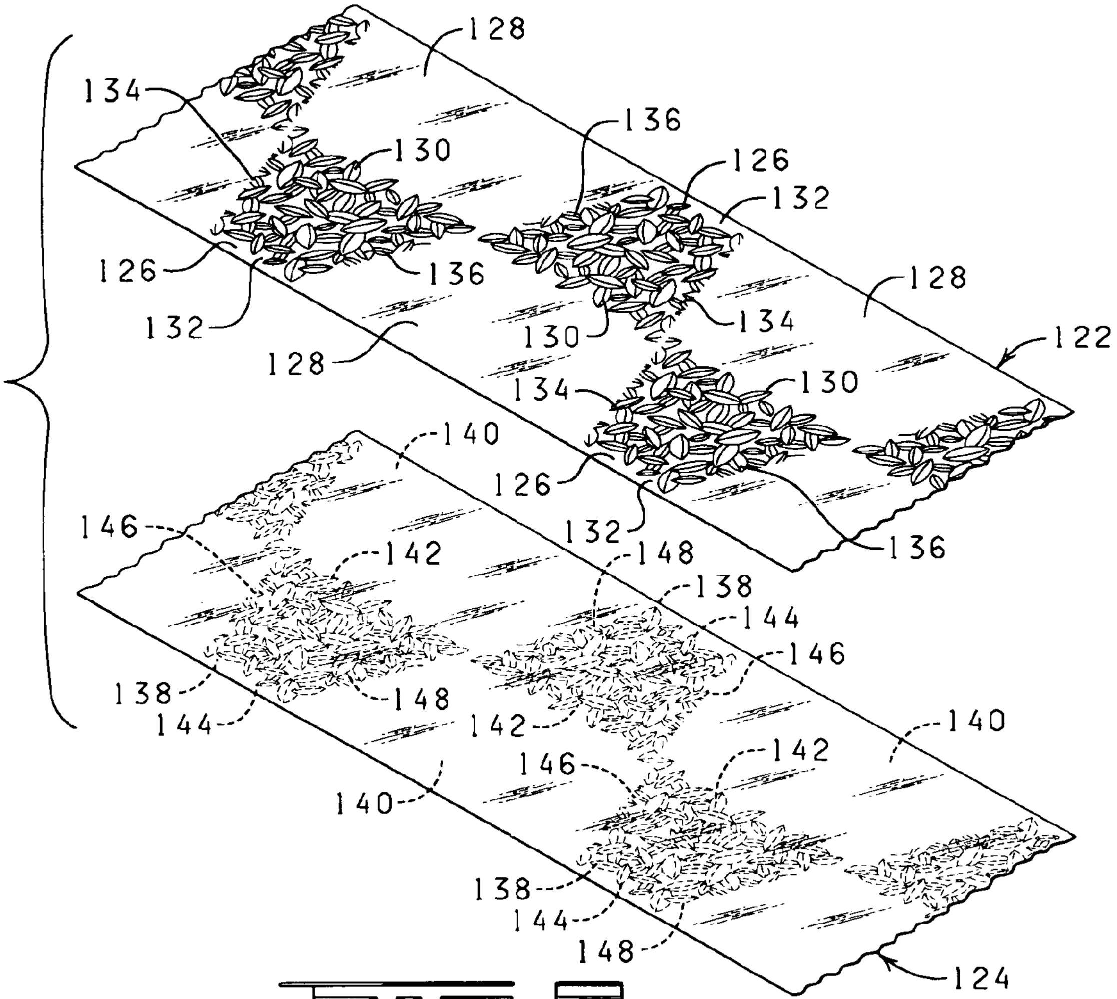
FIG. 9 is a perspective view of a portion of a pair of webs of sheet material illustrating another embodiment of a printing pattern constructed in accordance with the present invention for forming the sleeve of FIG. 3 with minimal excess material.
Figure 10:
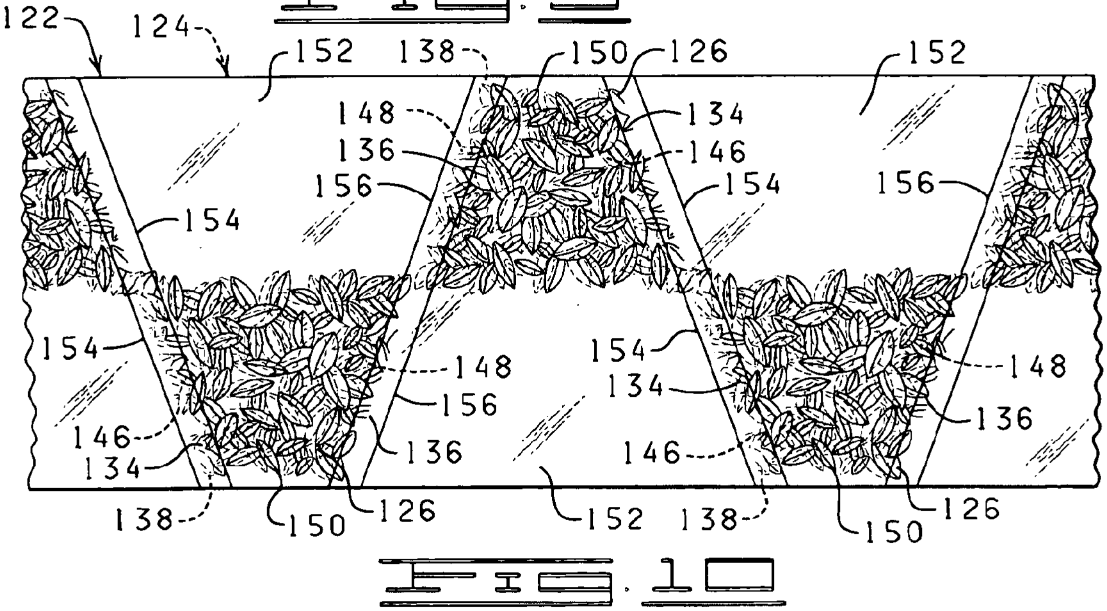
FIG. 10 is a plan view of the webs of material of FIG. 9 illustrating a cutting and sealing pattern for forming the sleeve of FIG. 3 with minimal excess material.

It will be appreciated that the method illustrated in FIGS. 7 and 8 requires that the printed portions 88 of the first web portion 84 be superimposed on the printed portions 100 of the second web portion 86 with a high degree of precision and that the first and second web portions 84 and 86 must be sealed and severed precisely along the coextensive edges of the printed portions 88 and 100 to form a series of sleeves wherein each sleeve has a printed portion that extends continuously about the exterior circumference of the lower portion of the sleeve without resulting in the waste of any material. FIGS. 9 and 10 illustrate another method of forming a series of sleeves which does not require the high degree of precision demanded in the method of FIGS. 7 and 8.

FIG. 9 shows a pair of webs of material or web portions 122 and 124 for use in forming a plurality of sleeves wherein each of the sleeves has an upper portion and a lower portion with the lower portion having a printed portion extending continuously about the circumference of the lower portion of the sleeve. The first web portion 122 is printed with a plurality of successive printed portions 126 extending along the longitudinal axis of the first web portion 122 in a staggered, inverted relationship. The first web portion 122 further has a plurality of corresponding unprinted portions 128. Each printed portion 126 of the web portion 122 has a top edge 130, a bottom edge 132, a first side edge 134, and a second side edge 136. The first and second side edges 134 and 136 of each printed portion 126 are angled outwardly from the bottom edge 132 to the top edge 130 such that each of the printed portions 126 has a generally trapezoidal shape. Further, the first web portion 122 is printed with the printed portions 126 such that the first side edge 134 of each printed portion is generally aligned with the first side edge 134 of the adjacent printed portion 126 so as to be parallel or coextensive with the first side edge 134 of the adjacent printed portion 126 and such that the second side edge 136 of each printed portion 126 is generally aligned with the second side edge 136 of the oppositely adjacently printed portion 126 so as to be parallel or coextensive with the second side edge 136 of the oppositely adjacently printed portion 126.

It will be appreciated by those of ordinary skill in the art that the method illustrated in FIGS. 9 and 10 may be carried out to attain the advantages of forming sleeves with a printed portion extending continuously about the circumference of the lower portion of the sleeve without having to waste or discard a significant amount of material in the process even if the first and second edges of the printed portions are not coextensive with each other, as is illustrated in FIGS. 9 and 10. However, less material is likely to be wasted or discarded when the first and second side edges of the printed portions are coextensive with each other.

Like the first web portion 122, the second web portion 124 has a plurality of successive printed portions 138 extending along the longitudinal axis of the second web portion 124 in a staggered, inverted relationship and a plurality of corresponding unprinted portions 140. Each printed portion 138 of the second web portion 124 has a top edge 142, a bottom edge 144, a first side edge 146, and a second side edge 148. The first and second side edges 146 and 148 of each printed portion 138 are angled outwardly from the bottom edge 144 to the top edge 142 such that each of the printed portions 138 has a generally trapezoidal shape. Further, the second web portion 124 is printed with the printed portions 138 such that the first side edge 146 of each printed portion 138 is generally aligned with the first side edge 146 of the adjacent printed portion 138 so as to parallel or coextensive with the first side edge 146 of the adjacent printed portion 138, and the second side edge 148 of each printed portion 138 is generally aligned with the second side edge 148 of the oppositely adjacent printed portion 138 so as to be parallel or coextensive with the second side edge 148 of the oppositely adjacent printed portion 138.

As illustrated in FIG. 10, the first web portion 122 is positioned on the second web portion 124 such that the printed portions 126 of the first web portion 122 are substantially superimposed over the printed portions 138 of the second web portion 124 to form a plurality of superimposed pairs of printed portions 150. Further, the first web portion 122 is positioned on the second web portion 124 such that the unprinted portions 128 of the first web portion 122 are substantially superimposed over the unprinted portions 140 of the second web portion 124 to form a plurality of superimposed pairs of unprinted portions 152. As mentioned above, the method illustrated in FIGS. 9 and 10 does not require the printed portions 126 and the printed portions 138 to be superimposed with the precision of that required to carry out the method illustrated in FIGS. 7 and 8. To this end, FIG. 10 further illustrates the instance when the printed portions 126 of the first web portion 122 are slightly offset from, or misaligned with, the printed portions 138 of the second web portion 124, thereby obviating the method illustrated in FIGS. 7 and 8.

To overcome the fact that the printed portions 126 and 138 may not be exactly superimposed on each other, a series of sleeves is formed by sealing and severing the first and second web portions 122 and 124 along a plurality of first lines 154 and plurality of second lines 156. Each of the first lines 154 traverses one of the superimposed pairs of printed portions 150 such that the first line 154 traverses each of the printed portions 126 and 138 near the first side edges 134 and 148 of the web portions 122 and 124, respectively. Each of the first lines 154 further traverses each unprinted portion 128 and 140 of a corresponding superimposed pair of unprinted portions 152 proximate to the first side edges 134 and 146 of the printed portions 126 and 138 of the adjacent superimposed pair of printed portions 150 thereby forming a sealed first edge.

The second lines 156 traverse each of the printed portions 126 and 138 of the superimposed pairs of printed portions 150 proximate to the second side edges 136 and 148 of the printed portions 126, 138, respectively. Each of the second lines 156 further traverse each unprinted portion 128 and 140 of the corresponding superimposed pair of unprinted portions 152 proximate to the second side edges 136 and 148 of the printed portion 126 and 138 of the oppositely adjacent superimposed pair of printed portions 150, thereby forming a sealed second edge.

As shown in FIG. 10, each first line 154 is spaced from an adjacent first line 154 to form a strip of material 158 therebetween, and each second line 156 is spaced from an adjacent second line 156 to form a strip of material 160.

Upon sealing and severing the first and second web portions 122 and 124 along the first lines 154 and the second lines 156, and discarding the strips of material 158 and 160, a plurality of sleeves 162 is formed. Because the first and second lines 154 and 156 traverse each of the printed portions 126 and 138 and traverse the corresponding unprinted portions 128 and 140, each of the sleeves 162 has an upper portion and a lower portion with the lower portion having a printed portion extending continuously about the exterior circumference of the lower portion of the sleeve while the upper portion is free of any printing contained in the lower portion of an adjacently formed sleeve. Furthermore, while some material must be discarded, the amount of material discarded is significantly less than the amount of material discarded using the prior art method described above with reference to FIG. 6.

The methods of FIGS. 7–10 are carried out by intermittently advancing, in timed sequence aided with photoelectric eyes (not shown) a pair of webs of material, a single web of material folded upon itself, or even a tubular web of material to a sealing and severing station wherein a sealing bar (not shown) is activated to seal the overlapping web portions to form sleeves in accordance with the methods described above. Machines adaptable for producing sleeves in accordance with the methods of the present invention are well known in the art and available from Lemo Maschinenbau GmbH, Niderkassel-Mondorf, Germany, as well other manufacturers of bag-making machines.

From the above description it is clear that the present invention is well adapted to carry out the objects and to attain the advantages mentioned herein as well as those inherent in the invention. While presently preferred embodiments of the invention have been described for purposes of this disclosure, it will be understood that numerous changes may be made which will readily suggest themselves to those skilled in the art and which are accomplished within the spirit of the invention disclosed and as defined in the appended claims.

What is claimed is:

1. A method of forming a plurality of sleeves wherein each of the sleeves has an upper portion and a lower portion with the lower portion having a printed portion, the method comprising:

providing a first web portion having a plurality of printed portions extending along a longitudinal axis of the first web portion in a staggered, inverted relationship and a plurality of corresponding substantially transparent portions, each of the printed portions of the first web portion having a top edge, a bottom edge, a first side edge, and a second side edge, the first and second side edges of each printed portion angled outwardly from the bottom edge to the top edge;

providing a second web portion;

positioning the first web portion on the second web portion; and sealing and severing the first and second web portions along a plurality of first lines and a plurality of second lines to form a plurality of sleeves wherein each sleeve has an upper portion and a lower portion with the lower portion having a printed portion while the upper portion is free of printing from the printed portions of the first web portion, each of the first lines traversing the printed portions of the first web portion substantially proximate to the first side edges of the printed portions of the first web portion and traversing the substantially transparent portions of the first web portion substantially parallel and proximate to the first side edges of the printed portions of the adjacent printed portion of the first web portion.

2. The method of claim 1 wherein in the step of sealing and severing the first and second web portions, each first line is spaced from an adjacent first line to form a strip of material therebetween.

3. The method of claim 1 wherein each of the second lines traverses each of the printed portions of the first web portion substantially parallel and proximate to the second side edges of the printed portions of the first web portion and traverses the substantially transparent portions of the corresponding substantially transparent portions of the first web portion substantially parallel and proximate to the second side edges of the printed portions of the adjacent printed portion of the first web portion.

4. The method of claim 3 wherein in the step of sealing and severing the first and second web portions, each second line is spaced from an adjacent second line to form a strip of material therebetween.

5. The method of claim 3 wherein in the step of sealing and severing the first and second web portions, each first line is spaced from an adjacent first line to form a strip of material therebetween, and each second line is spaced from an adjacent second line to form a strip of material therebetween.

6. A method of forming a plurality of sleeves wherein each of the sleeves has an upper portion and a lower portion with the lower portion having a printed portion, the method comprising:

providing a first web portion having a plurality of printed portions extending along a longitudinal axis of the first web portion in a staggered, inverted relationship and a plurality of corresponding substantially transparent portions, each of the printed portions of the first web portion having a top edge, a bottom edge, a first side edge, and a second side edge, the first and second side edges of each printed portion angled outwardly from the bottom edge to the top edge, the first side edge of each printed portion being coextensive with the first side edge of one of the adjacent printed portions;

providing a second web portion;

positioning the first web portion on the second web portion; and sealing and severing the first and second web portions along a plurality of first lines and a plurality of second lines to form a plurality of sleeves wherein each sleeve has an upper portion and a lower portion with the lower portion having a printed portion while the upper portion is free of printing from the printed portions of the first web portion, each of the first lines extending along the coextensive first side edges.

7. The method of claim 6 wherein the second side edge of each printed portion is coextensive with the second side edge of the adjacent printed portion, and wherein each of the second lines extend along the coextensive second side edges.

* * * * *